United States Patent [19]
Ikeda et al.

[11] 3,815,148
[45] June 4, 1974

[54] ELECTRICAL EXPOSURE CONTROL DEVICES FOR USE WITH A PHOTOGRAPHIC CAMERA

[75] Inventors: Kotaro Yata Ikeda; Yasuhiro Nanba, both of Oakai; Masayoshi Sahara, Sakai, all of Japan

[73] Assignee: Minolta Camera Kabushiki Kaisha, Osaka-shi, Osaka-fu, Japan

[22] Filed: July 27, 1972

[21] Appl. No.: 275,698

[30] Foreign Application Priority Data
July 27, 1971 Japan.............................. 46-66052
Apr. 15, 1972 Japan.............................. 47-43918

[52] U.S. Cl.................................. 354/24, 354/51
[51] Int. Cl........................... G03b 7/08, G03b 9/62
[58] Field of Search................................. 95/10 CT

[56] References Cited
UNITED STATES PATENTS
3,643,563  2/1972  Nobusawa .................. 95/10 CT
3,728,946  4/1973  Kuramoto et al. .............. 95/10 CT FOREIGN PATENTS OR APPLICATIONS
4,418,672  8/1969  Japan ......................... 95/10 CT Primary Examiner—Samuel S. Matthews
Assistant Examiner—Russell E. Adams, Jr.
Attorney, Agent, or Firm—Watson, Cole, Grindle & Watson

[57] ABSTRACT

In an electrical exposure control device for use with reflex type photographic cameras, the voltage stored in a storage device is accurately retained after the light has been detected by a light receptive element and prior to the use of the stored voltage for purposes of exposure control by structure which ensures that the required switching of the stored voltage is coincidentally timed with the actual movement of the shutter mechanism to initiate an exposure, thereby eliminating unwanted decay between operation of a change-over switch and actual movement of the shutter mechanism.

2 Claims, 5 Drawing Figures

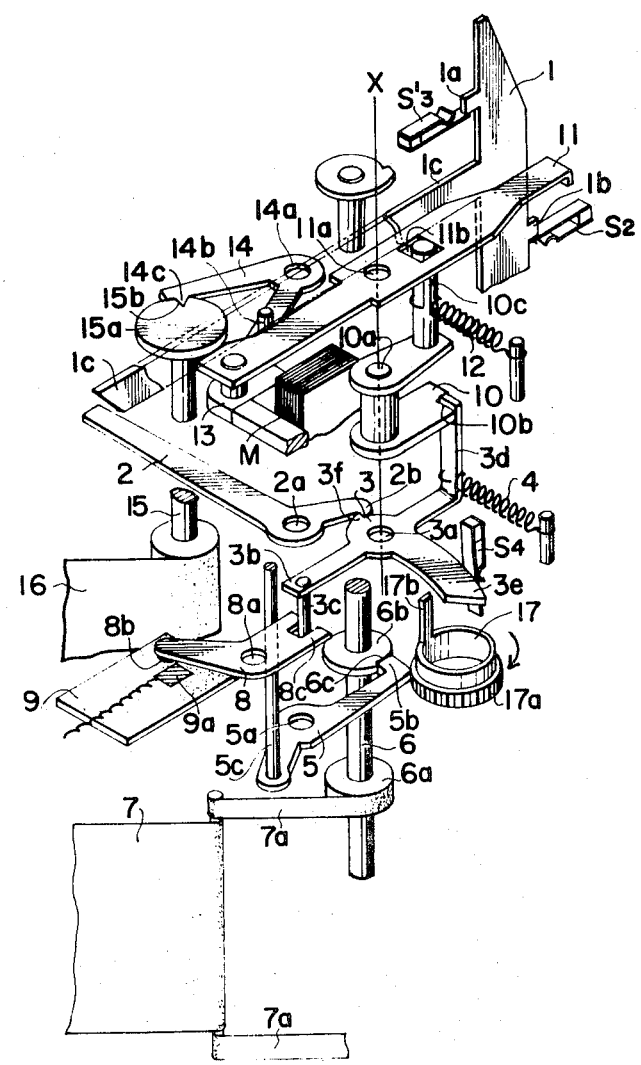

ELECTRICAL EXPOSURE CONTROL DEVICES FOR USE WITH A PHOTOGRAPHIC CAMERA

BACKGROUND OF THE INVENTION

This invention relates to electrical exposure control devices for use with photographic cameras and, more particularly, to such control devices wherein the voltage proportional to the transmitted light rays through the object lens is detected, stored, and applied to an inverse logarithmic circuit to generate a current proportional to the inverse logarithm of the voltage. More specifically, the invention relates to such electrical exposure control devices wherein variations of the stored voltage are eliminated before the light exposure of the film in the camera takes place through the shutter release operation.

In general, the single lens reflex camera has a movable mirror alternating between a viewing and a photographic position by means of appropriate camera controls. When the mirror is in the viewing position, the photoelectric element receives the light from the object to be photographed. In the single lens reflex camera, therefore, it is necessary to detect and measure the light from the object while the mirror is in the viewing position and to store a signal representative of the light intensity. It is a generally accepted technique to compress a very wide range of light intensity involved in modern photography into its logarithmic value for storage after the light from the object to be photographed has been converted to a voltage by a light receiving element, and to have the stored voltage logarithmically inverted to control the camera exposure time.

For this purpose, a switch operating in conjunction with the shutter release isolates the detection circuit from the storage circuit and connects the storage circuit to the timing circuit through the inverse logarithmic circuit.

The mechanism of the release operation requires about 30 milli-seconds from the time when the mirror starts revolving through the shutter release operation until the shutter is opened. With the addition of the above-mentioned switch to transfer the electrical connection of the storage circuit from the detection circuit to the inverse logarithmic circuit, the overall delay will become longer. During this delay, the stored voltage is lost gradually by the discharging through the base of the transistor in the inverse logarithmic circuit, thus introducing an error in the exposure time control. Because the stored voltage is the logarithmic representation of the intensity of the light from the object, the conventional electrical exposure control has an important disadvantage in that there is a greater error in the exposure time control, and the shutter speed is automatically set higher by the electrical exposure control device.

OBJECTS OF THE INVENTION

One object of the invention is to eliminate the variation of the voltage stored in the electrical exposure control device prior to controlling the exposure time, the stored voltage having been transformed by the photoelectric receiving light element in proportion to the logarithm of the light intensity detected by that element after the light from the object to be photographed has been passed through the object lens.

Another object of the invention is to keep inactive the inverse logarithmic circuit, to which the storage circuit is connected upon the release operation, until the shutter opens through the release operation.

Still another object of the invention is to cause the inverse logarithmic circuit to operate upon the closure of a trigger switch coincidental with the shutter opening, after the inverse logarithmic circuit has been connected to the storage circuit in conjunction with the shutter release operation.

SUMMARY OF THE INVENTION

According to the present invention, an electrical exposure control device comprises the following components. A light receptive element to receive light rays through the object lens of a camera before exposure. A detection circuit to obtain an output voltage proportional to the logarithm of the light intensity received by the light receptive element. A storage circuit for storing the output voltage through a switch operated conjunctively with the shutter release operation. A change-over switching mechanism operating also in conjunction with the shutter release operation to disconnect the storage circuit from the detection circuit and to connect the storage circuit to an inverse logarithmic circuit, for charging an integrating capacitor with a constant current of a magnitude proportional to the inverse logarithm of the stored output voltage. And a switching circuit actuated at a preset level of the accumulated charge in the integrating capacitor to energize an electromagnet to control the exposure time. The above-mentioned electrical exposure control device has an additional feature of having a trigger switch operated to be closed coincidentally with the starting of the shutter opening and to actuate the inverse logarithmic circuit simultaneously therewith.

BRIEF DESCRIPTION OF THE DRAWINGS

FIG. 5 shows a perspective view of the detailed construction of the mechanism operated by the exposure control devices of the invention.

DETAILED DESCRIPTION OF THE INVENTION

Figure 1:
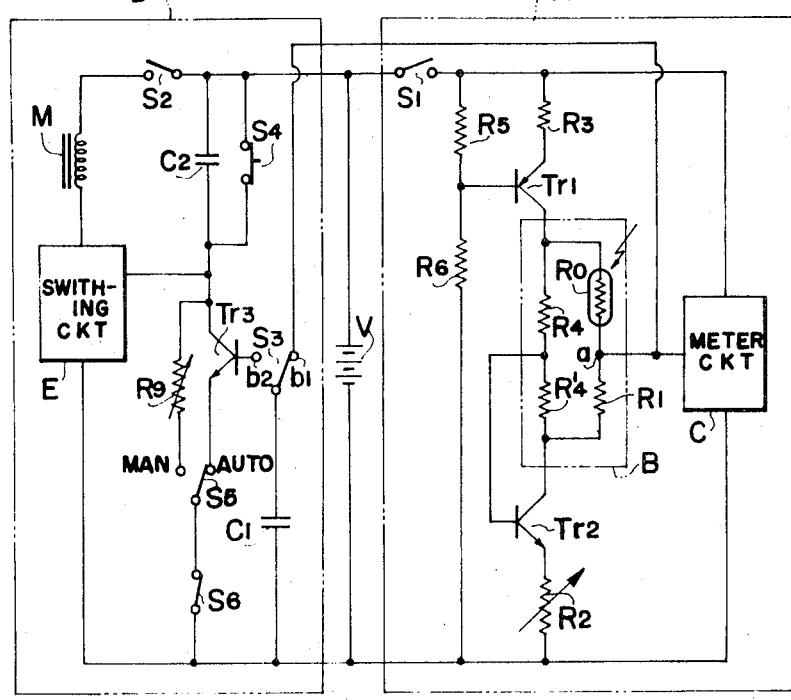
FIG. 1 shows the first embodiment of the invention.

In FIG. 1, the block A indicated by the chain line represents the detection circuit, comprising voltage generator circuit B and meter circuit C. Meter circuit C has its input connected to the output of the generator circuit B for amplifying and metering purposes.

The battery of power supply V is connected through switch S1 to resistances R5 and R6 in series, with the junction point of the two resistances connected to the base of transistor Tr1 to establish the operating potential thereof. Transistors Tr1 and Tr2 are connected back-to-back with the respective collectors being connected to each other through series connected resistances R4 and R'4. Light receiving element RO, in series with resistance R1, is connected in parallel with R4 and R'4, and that configuration constitutes voltage generator circuit B. Transistor Tr2 is connected by its base to the junction of resistances R4 and R'4, and its emitter is connected to the potentiometer R2, which is set by the aperture opening of the camera and by the selected film sensitivity.

The collector current of transistors Tr1 and Tr2 flows mostly through the resistances R4 and R'4, because their resistance value is chosen sufficiently smaller than that of resistors R0 and R1. The voltage across resistances R4 and R'4 is divided at junction $a$ in accordance with the respective value of resistances R0 and R1. Since light receptive element R0 converts the detected light intensity into a current proportional to the logarithm of the light intensity, the voltage across resistance R1 is proportional to the logarithm of the light intensity.

The potential of junction $a$ is thus determined by the logarithm of the detected light intensity of the light receptive element and the setting of potentiometer R2, which is determined by the preset aperture opening and the selected film sensitivity. The potential of junction $a$ is connected to meter circuit C to be indicated on a meter scale calibrated in shutter speed consistent with the preset shutter opening and selected film speed.

The portion of the circuit marked with the chain line D functions as a storage circuit for the potential at junction $a$. It comprises change-over switch S3, storage capacitor C1 connected to junction $a$ through switch S3; transistor Tr3 with its base connected to C1 through S3; the timing circuit consisting of transistor Tr3 and integrating capacitor C2; and switching circuit E triggered at a preset level of the accumulated charge of capacitor C2 to actuate electromagnet M.

The contact $b1$ of the switch S3 is connected to junction $a$, and contact $b2$ is connected to the base of transistor Tr3, which converts the base voltage to a constant collector current proportional to the inverse logarithm of the applied base voltage. The non-switched contact of switch S3 is connected to storage capacitor C1. The collector of transistor Tr3 is connected to integrating capacitor C2 and switch S4 is normally connected across capacitor C2. The emitter of transistor Tr3 is connected to the "AUTO" contact of switch S5, from trigger switch S6.

Figure 2:
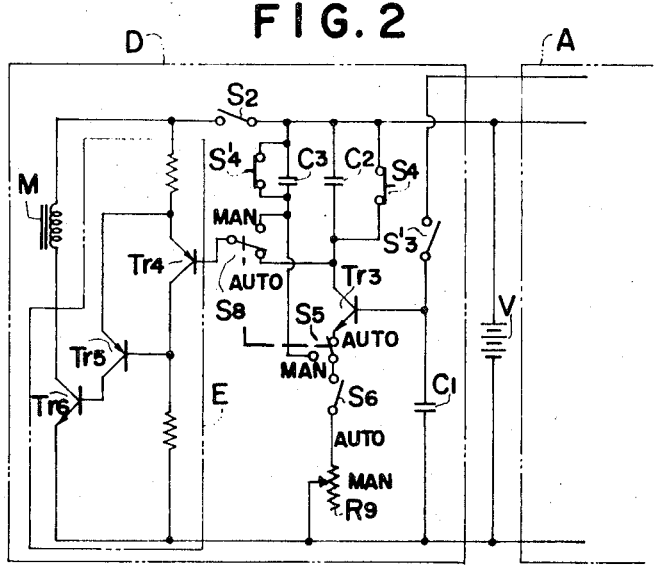
FIG. 2 shows the second embodiment of the invention.

The "MAN" contact of S5 is connected to potentiometer R9, the setting of which is determined by the shutter speed setting. The voltage across integrating capacitor C2 with switch S4 open is applied to switching circuit E, and the terminals thereof are respectively connected to electromagnet M and to battery V. Switching circuit E is shown in FIG. 2 inside the chain line. It is a conventional circuit configuration consisting of transistors Tr4, Tr5 and Tr6, and the electromagnet coil is connected to the collector of Tr6.

Switch S4 normally shorts capacitor C2 to remove any residual charge thereon and to prepare capacitor C2 for the accumulation of charge at the opening of the shutter. Switch S4 is opened prior to the closure of trigger switch S6. Switch S5 selects either automatic or manual setting of the exposure time and can be conveniently actuated with the movement of the shutter dial of the camera. Trigger switch S6 is kept open to hold transistor Tr3 in the cut-off state as protection for the premature contact closure of contact $b2$ of switch S3 until switch S6 is closed coincidental with the actual opening of the shutter through the release operation.

FIG. 2 shows the second embodiment of the invention in which the same notations are applied to indicate the same components as in FIG. 1. In FIG. 2 two integrating capacitors are separately arranged; one capacitor is for automatic exposure time control and the other capacitor is for manual exposure time control. Integrating capacitor C2 is connected to the collector of transistor Tr3 and to the "AUTO" contact of switch S8, while capacitor C3 is connected to the "MAN" contacts of switches S5 and S8. Integrating capacitors C2 and C3 each respectively have shorting switches S4 ad S'4. In this example, transistor Tr3 is directly connected to capacitor C1 and single-pole switch S'3 connects capacitor C1 to junction $a$.

The non-switched contact of switch S5 is connected through trigger switch S6 to potentiometer R9, which sets the shutter speed in the case of manual exposure time control, or else it is shorted in the case of automatic exposure time control. The input terminal of switching circuit E is connected through ganged switches S5 and S8 to capacitor C2 in the automatic mode.

While in the above two embodiments of FIGS. 1 and 2 trigger switch S6 is connected to the emitter of transistor Tr3, in the fourth and the fifth embodiments (FIGS. 3 and 4, respectively), transistor Tr3, performing the same inverse logarithmic transformation, has its base connected to trigger switch S6. Change-over switch S'3 is connected to storage C1 capacitor through the "AUTO" contact of switch S8 in the third embodiment and storage capacitor C1 is interconnected in the fourth embodiment as in the second embodiment.

Figure 3:
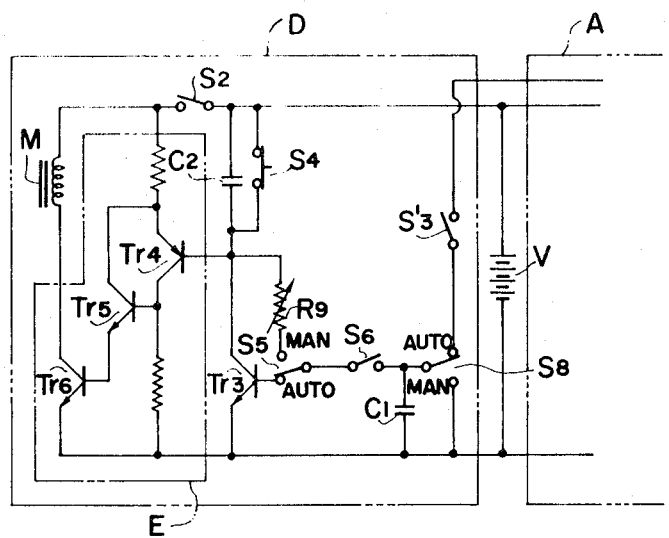
FIG. 3 shows a third exemplary circuit schematic, embodying the invention.

In FIG. 3, switch S'3 interconnects junction $a$ (which is not shown) and the "AUTO" contact of switch S8, with the other "MAN" contact being connected to the negative end of the power supply V. The non-switched contact is connected to storage capacitor C1 and also to change-over switch S5 through trigger switch S6, which is closed upon the initiation of the shutter opening through the release operation.

The "AUTO" contact of switch S5 is connected to the base of transistor Tr3, with the collector thereof connected to integrating capacitor C2 and shorting switch S4. The "MAN" contact of switch S5 is connected through potentiometer R9 to integrating capacitor C2; the voltage across capacitor C2 is supplied to transistor Tr4 of the switching circuit.

Switches S5 and S8 are ganged so that they are both changed over to the "AUTO" position conjunctively, for example, with an appropriate setting of a shutter speed dial for automatic exposure time control, or else they are both changed over to the "MAN" position in conjunction with the manual setting of the shutter speed dial. When the switches S5 and S8 are both in the "AUTO" position, the closure of switch S'3 causes storage capacitor C1 to be charged to the output voltage of the detection circuit A, and with the opening of switch S'3, that voltage is stored intact. With the initiation of the shutter opening, the voltage stored by storage capacitor C1 is impressed on the base of transistor Tr3 through the closure of trigger switch S6, making transistor Tr3 conductive to generate a collector current of a value proportional to the inverse logarithm of the stored voltage. Integrating capacitor C2 is thereby charged by that collector current. Upon reaching a predetermined level of accumulated charge, capacitor C2 triggers the switching circuit to a nonconductive state, thereby actuating electromagnet M to complete the exposure.

With the switches S5 and S8 both in the "MAN" position, capacitor C1 is shorted, and upon the closure of trigger switch S6, integrating capacitor C2 is charged by a current passing through potentiometer R9, and when it reaches a predetermined level, the camera exposure is completed in the same manner previously described.

Figure 4:
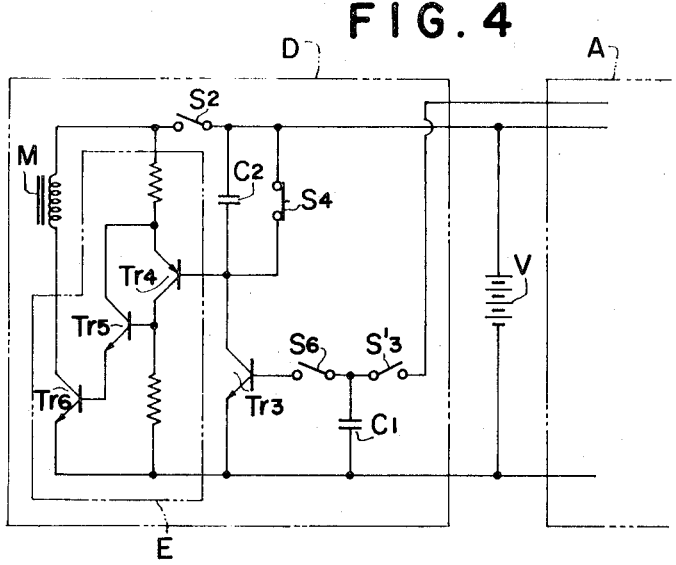
FIG. 4 shows the fourth embodiment of the subject invention.

The circuit shown in FIG. 4, representing the fourth embodiment, does not include the portion of the circuit for manual exposure time control setting of FIG. 3. Accordingly, switches S5 and S8 are removed. FIG. 5 shows the main components of camera mechanism and the interaction of that mechanism with the four embodiments of the control circuitry is described with reference to the circuit of FIG. 4.

By depressing vertically movable release rod 1, projection 1a opens switch S'3, whereby the output voltage of receiving light element R0, proportional to the logarithm of the detected light intensity of that element and available from the detection circuit as previously stored in storage capacitor C1 while switch S'3 was closed, is retained intact by capacitor C1. Another projection 1b is so formed on release rod 1 to close switch S2, which was originally open during the early stage of the downward movement of rod 1. Further, rod 1 has arm 1c formed in such a way that during the downward stroke of release rod 1, arm 1c engages with restraining lever 2. Restraining lever 2, held by a pin to the camera body through pivot hole 2a, has pawl 2b engaged with pawl 3f formed on movable plate 3 held by pin X through center hole 3a, while the shutter is in the cocked position as shown in FIG. 5.

Further, operation plate 3 has arm 3b with a pin 3c fixed thereto, elbow 3d, the arm 3e, which engages with the leaf of switch S4 to close its contact against the bias of the leaf to keep the contact open. Elbow 3d has a spring hooked to a fixed member in the camera body, so as to give operating plate 3 a biased CCW rotation. In the position of FIG. 5, switch S4 is closed against its tendency to open and it will be opened when operating plate 3 makes a CW rotation.

In the foregoing description, the release rod and the operating plate are only instrumental to the operation of switches S2 and S4 required to achieve the necessary timing, subject to the condition that, prior to the initiation of the camera exposure through the release operation, switch S2 is closed and switch S4 is opened as well. The operation of these switches, therefore, can be achieved likewise in conjunction with other related operations of the camera prior to the shutter release such as the transfer motion of the mirror from a viewing to a photographic position, or the iris setting action in the preset mechanism of the camera, etc.

Switch lever 8, held by a pin, is rotatable around hole 8a, has contact 8b formed on its end and bifurcation 8c formed on the other end to which is inserted pin 3c, whereby contact 8b, sliding over insulating base plate 9 makes or breaks with contact 9a formed thereon, as lever 8 swings around. Contacts 8b and 9a constitute trigger switch S6.

Front curtain restraining lever 5, held movable around pin center 5a, has pin 5c fixed on one arm, which engages with aforementioned switch lever 8, and the pawl 5c formed on the other arm. On front curtain shaft 6, having discs 6a (only one of which is shown in FIG. 5) fastened at respective spaced positions along the longitudinal axis thereof and ribbons 7a connected to front curtain 7 and wound around discs 6a, cam plate 6b is fastened with notch 6c engaged with pawl 5b in a cocked position.

Notch 10b and pin 10c are formed on the respective arms of intermediate member 10, held movable by pin X through center hole 10a. Notch 10b engages with elbow 3d and pin 10c hooked to a fixed part of the camera body by spring 12, thus giving to member 10 a bias for CW rotation.

Rear curtain operating lever 11, rotatable around hole 11a is held by pin X, has armature 13 arranged on one end of the lever, which cooperates with electromagnet M, and aperture 11b through which pin 10c is loosely projected. A spring (not shown in the drawing) can be conveniently installed between pin X and pin 10c to absorb an overcharge when the shutter has been cocked.

Notch 15b is formed on cam plate 15a and is fastened to rear curtain shaft 15 having rear curtain 16 wound thereon. Rear curtain restraining lever 14, rotatable around hole 14a by a pin fixed to the camera body, has pawl 14c formed on one arm thereof, which engages with notch 15b of the cam plate at the cocked position of rear curtain shaft 15. Lever 14 has fixed pin 14b on the other arm thereof, which is engaged with the side edge of rear curtain operating lever 11.

Linkage member 17, with gear wheel 17a interlocked with the shutter cocking member, has projection 17b, and when the film advancement and the shutter cocking is completed, projection 17b engages with arm 3e and causes arm 3e to rotate CCW against the force of spring 4, whereby pawl 3f engages with pawl 2b on restraining lever 2.

From the construction as described above and with the shutter cocked as in FIG. 5, it follows that when release rod 1 is depressed switch S'3 opens first, followed by the closure of switch S2, thereby making the switch circuit conductive and energizing electromagnet M. Arm 1c engages with restraining lever 2 and causes it to rotate CCW disengaging pawl 2a from pawl 3f and operating plate 3 rotates CW by spring 4. Switch S4 then opens via its own opening bias and elbow 3d is dislocated from notch 10b of intermediate member 10.

While electromagnet M is being energized, however, armature 13 is pulled inwardly and the rotating motion of rear curtain operating plate 11 is blocked. Pin 3c rotates switch lever 8 CCW, closing trigger switch S6 with pin 5c causing front curtain restraining lever 5 to rotate CW to free front curtain shaft 6 so that front curtain 7 starts traversing and the exposure is initiated. The closure of trigger switch S6 makes transistor Tr3 conductive by the application of the stored voltage on capacitor C1, which voltage has a value proportional to the logarithm of the light intensity on the receiving light element at the time of detection; and integrating capacitor C2 of the timing circuit starts to charge by the collector current of transistor Tr3. That current represents the inverse logarithm of the stored voltage.

When the voltage of capacitor C2 reaches a preset voltage level, the switching circuit flips back to the cut-off state, deenergizing electromagnet M. Therefore, rear curtain operating lever 11, exerted by spring 12, starts to rotate CW. Rear curtain restraining lever 14 rotates CW through the motion of pin 14c, whereby releasing the engagement between cam plate 15a and notch 15b, and setting the rear curtain into traverse motion and completing the exposure.

In the conventional device, wherein the trigger switch S6 of the invention is not provided, either switch S3 or switch S4 has to operate in its place. In the former case, the synchronism between the operation of switch S3 and the initiation of the exposure is hard to achieve; especially in the case of a single lens reflex camera wherein the disconnection of the detection circuit from the storage circuit must occur prior to the mirror transfer, and the requirement of the synchronization becomes even more difficult. In the case where S4 acts as the trigger switch, there can always be a decay of the stored voltage as mentioned above.

In this subject invention, however, the above disadvantages are resolved by having trigger switch S6 installed in the base or in the emitter of the transistor used for the inverse logarithmic transformation.

It should be understood that the above-mentioned are only a few examples of embodiments of the present invention and other modifications or alterations of design may be made without departing from the spirit of the present invention.

What is claimed is:

1. An electrical exposure control device for use with a photographic camera of the type having a light receptive element for receiving light through the objective lens and means movable prior to shutter actuation from a first to a second position in response to shutter release operation and wherein light measurement is made with said movable means in said first position and light is blocked from said light receptive element with said movable means in said second position, comprising:

means including said light receptive element for generating a first signal proportional to the logarithm of the light received by said light receptive element;

means for storing said signal;

first switching means for connecting and disconnecting said means for generating respectively to or from said storage means;

means for operating said first switching means prior to actuation of said movable means;

means for generating a second signal proportional to the inverse logarithmic transformation of said stored first signal; a second switching means for initiating operation of said means for generating said second signal simultaneously with the initiation of shutter opening;

means for integrating said second signal;

means for effecting shutter closing when said means for integrating reaches a predetermined level; and said means for generating said second signal comprises a transistor, said first signal is a voltage, said second signal is a current, said first signal is applied to the base of said transistor for generating said current in the collector thereof with said first switching means connecting said stored voltage to said base; and further comprising a power source, said second switching means connecting the emitter of said transistor to said power source with the initiation of shutter movement, said means for integrating is a capacitor and the collector of said transistor is connected to said capacitor.

2. An electrical exposure control device for use with a photographic camera of the type having a light receptive element for receiving light through the objective lens and means movable prior to shutter actuation from a first to a second position in response to shutter release operation and wherein light measurement is made with said movable means in said first position and light is blocked from said light receptive element with said movable means in said second position, comprising:

means including said light receptive element for generating a first signal proportional to the logarithm of the light received by said light receptive element;

means for storing said signal;

first switching means for connecting and disconnecting said means for generating respectively to or from said storage means;

means for operating said first switching means prior to actuation of said movable means;

means for generating a second signal proportional to the inverse logarithmic transformation of said stored first signal; a second switching means for initiating operation of said means for generating said second signal simultaneously with the initiation of shutter opening;

means for integrating said second signal;

means for effecting shutter closing when said means for integrating reaches a predetermined level; and wherein said means for generating said second signal comprises a transistor, said first signal is a voltage, said second signal is a current, said first signal is applied to the base of said transistor for generating said current in the collector thereof with said second switching means connecting said stored voltage to said base, said means for integrating is a capacitor and the collector of said transistor is connected to said capacitor.

* * * * *

UNITED STATES PATENT OFFICE
CERTIFICATE OF CORRECTION

PATENT NO. : 3,815,148
DATED : June 4, 1974
INVENTOR(S) : YATA et al

It is certified that error appears in the above-identified patent and that said Letters Patent are hereby corrected as shown below:

[75] Inventors: Kotaro Yata;
Yasuhiro Nanba; and
Masayoshi Sahara, all of
Osaka-fu, Japan Signed and Sealed this nineteenth Day of August 1975

[SEAL]

Attest:

RUTH C. MASON
Attesting Officer

C. MARSHALL DANN
Commissioner of Patents and Trademarks